No. 663,116. Patented Dec. 4, 1900.
P. BROMAN.
TRAP FOR REFRIGERATOR CARS.
(Application filed Feb. 28, 1898.)
(No Model.)
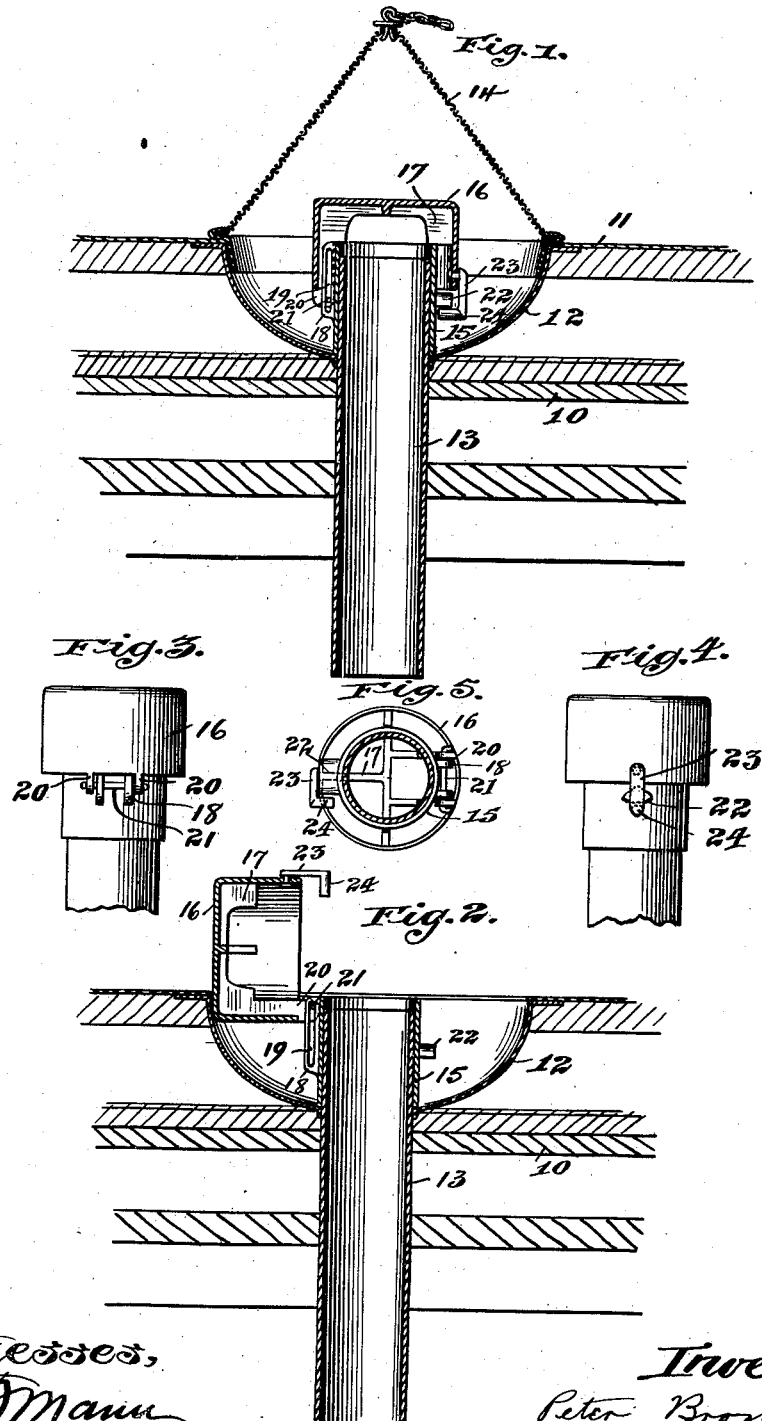
Witnesses,
Inventor,
Peter Broman,
By Offield, Towle & Linthicum,
Attys.

UNITED STATES PATENT OFFICE.

PETER BROMAN, OF CHICAGO, ILLINOIS, ASSIGNOR TO ARMOUR & CO., OF SAME PLACE.

TRAP FOR REFRIGERATOR-CARS.

SPECIFICATION forming part of Letters Patent No. 663,116, dated December 4, 1900.

Application filed February 28, 1898. Serial No. 672,035. (No model.)

*To all whom it may concern:*

Be it known that I, PETER BROMAN, of Chicago, in the county of Cook and State of Illinois, have invented certain new and useful Improvements in Traps for Refrigerator-Cars, of which the following is a specification.

This invention relates to traps for refrigerator-cars, and has for one object to provide a trap to be employed in connection with the ice-tanks of such cars which will permit the free escape of the water formed by the melting of the ice without permitting the external air to enter and thereby lower the temperature within the car, which trap shall permit the waste-pipe to be readily cleaned, either from the outside or inside of the car, without danger of damaging or displacing the trap.

It is a further object of my invention to provide a trap having a cap or upper portion which may be readily moved into a position such as to give free and unobstructed access to the interior of the waste-pipe, said cap being permanently attached to the pipe, so as to prevent its being lost or stolen, and said pipe and cap being provided with an automatic locking device whereby the two will be firmly connected by the act of placing the cap in operative position, thereby insuring prevention of displacement from the outside of the car.

To these ends my invention consists in certain novel features, which I will now proceed to describe, and will then particularly point out in the appended claims.

In the accompanying drawings, Figure 1 is a central vertical sectional view of a trap embodying my invention, the same being shown in place in a refrigerator-car in a closed or operative position. Fig. 2 is a similar view showing the cap raised and the trap open. Fig. 3 is an elevation of the trap from the rear or hinge side. Fig. 4 is a similar view from the opposite or locking side; and Fig. 5 is a bottom or inverted plan view, the waste-pipe being shown in section.

In the said drawings, 10 indicates the floor of a refrigerator-car, and 11 a portion of the drip-tray thereof provided with a depressed portion or cup 12.

13 indicates the waste-pipe, which extends through the floor of the car, its upper end projecting into the cup 12.

14 indicates a screen, preferably conical in form, to prevent the clogging of the trap by sawdust or other floating substances.

15 indicates a tubular extension of the waste-pipe, which extension surrounds the body of the waste-pipe, at the upper end thereof, and to which extension the cap is attached, although this extension may be omitted and the cap connected directly to the top of the waste-pipe.

16 indicates the cap, which is cylindrical in form, closed at its upper end and open at its lower end, and of greater internal diameter than the external diameter of the waste-pipe or its extension. This cap is provided internally with flanges or projections 17, which serve to properly center the cap when in operative position, maintaining its top at a suitable distance above the end of the waste-pipe and preventing lateral displacement of the cap. The cap is hinged to the waste-pipe or its extension, the latter being provided with two parallel lugs 18, provided with vertical slots 19, while the cap is provided with lugs 20, located adjacent to the lugs 18 and adapted to receive the ends of a pivot-pin 21, which extends through and is free to move in the slots 19.

At that side of the trap opposite to the one on which the hinge is located I provide an automatic locking mechanism, consisting of a lug 22 on the waste-pipe or its extension, and a bail or catch 23, pivoted to the cap. The lug 22 is beveled on its upper face, as shown in detail in Fig. 4, and the locking-pin 24 of the bail is similarly beveled on its lower face, while its upper face is plane.

The trap as thus constructed when in the position shown in Fig. 1 will permit the water which accumulates in the cup 12 to pass up freely between the cap and waste-pipe and out through this latter. If it is desired to have access to the waste-pipe from the interior of the car for the purpose of cleaning the same, the bail 23 may be moved laterally, so as to disengage its locking-pin 24 from the lug 22, whereupon the cap may be moved vertically, the slotted hinge connection permitting such vertical movement until it reaches a position where it may be swung back upon its pivot into the position shown in Fig. 2. When in this position, access may be had to the waste-pipe from above, and said pipe is entirely unobstructed. The trap may be closed by swinging the cap back into position over the end of the waste-pipe and then lowering it. The engagement of the beveled faces of the lug 22 and pin 24 will swing the bail 23 laterally to permit the cap to be lowered to its proper position, and when this position is reached the bail will swing back into a vertical position and by the engagement of its locking-pin with the lug 22 will prevent removal of the cap by means of a stick or other object thrust up through the waste-pipe from the exterior of the car.

It is customary in handling refrigerator-cars to clean the waste-pipes thereof and prevent their clogging by thus thrusting sticks or the like up through the waste-pipe, and the traps within the car are thereby frequently damaged or thrown out of place, thus becoming inoperative. My improved trap obviates this difficulty in that the cap cannot be displaced from the outside, since it is locked in position, and this locking is automatic, and therefore assured, being positively accomplished by the act of closing the trap. Moreover, the cap is firmly and permanently attached to the waste-pipe, so that it cannot be lost or stolen, and is also readily opened when it is desired to clean the waste-pipe from the interior of the car and as readily replaced after cleaning.

The ribs on the interior of the cap serve not only to properly center and support the cap, but also to strengthen the same and prevent its being punctured by the sticks employed in cleaning the waste-pipe from the outside of the car.

I claim—

1. A trap for refrigerator-cars, comprising a waste-pipe having an unobstructed interior and a cap of larger diameter than the pipe, having a permanent hinged connection with said pipe and provided with an automatically-engaging locking mechanism, comprising a lug upon the exterior of the waste-pipe, having a beveled upper surface and a pivoted bail connected with the cap and having a locking-pin upon its swinging end beveled on its under surface, the under surface of the lug and the upper surface of the pin being adapted to engage and resist upward motion of the cap upon its hinge, except when the bail is oscillated manually out of register with the lug, substantially as described.

2. A trap for refrigerator-cars, comprising a waste-pipe having an unobstructed interior and provided externally with vertically-slotted lugs, and a cap of larger diameter than said waste-pipe, having internal centering-flanges whereby its body is supported clear of the waste-pipe and centered thereon, and provided with a pivot-pin engaging said slotted lug, substantially as described.

3. A trap for refrigerator-cars, comprising a waste-pipe having an unobstructed interior, and provided externally on one side with vertically-slotted lugs and on the other side with a locking-lug having a beveled upper surface, and a cap of larger diameter than the waste-pipe, provided with a pivot-pin engaging said slotted lug, internal flanges or projections to bear against the sides and end of the waste-pipe and thereby center the body of the cap relatively to said pipe and support it clear of the same, and having a pivoted bail provided with a locking-pin beveled on its under surface, the upper surface of said pin and the under surface of the locking-lug being adapted to engage and prevent upward motion of the cap, substantially as described.

PETER BROMAN.

Witnesses:
R. S. VANCLEAVE,
GEORGE C. HUNT.